United States Patent [19]

Kim et al.

[11] Patent Number: 5,159,261
[45] Date of Patent: Oct. 27, 1992

[54] SUPERCONDUCTING ENERGY STABILIZER WITH CHARGING AND DISCHARGING DC-DC CONVERTERS

[75] Inventors: Sang H. Kim; Eric L. Kostecki; Carel C. DeWinkel, all of Madison, Wis.

[73] Assignee: Superconductivity, Inc., Middleton, Wis.

[21] Appl. No.: 717,616

[22] Filed: Jun. 19, 1991

Related U.S. Application Data

[63] Continuation-in-part of Ser. No. 594,273, Oct. 9, 1990, which is a continuation-in-part of Ser. No. 385,014, Jul. 25, 1989, Pat. No. 4,962,354.

[51] Int. Cl.⁵ ............................................. H01F 36/00
[52] U.S. Cl. ...................................... 323/360; 363/14; 363/65
[58] Field of Search ...................... 323/360; 363/14, 15, 363/65

[56] References Cited

U.S. PATENT DOCUMENTS

| | | |
|---|---|---|
| 2,088,040 | 7/1937 | Simons et al. |
| 2,194,822 | 3/1940 | Dannheiser |
| 2,913,881 | 11/1959 | Garwin |
| 2,987,631 | 6/1961 | Park, Jr. |
| 3,019,354 | 1/1962 | Anderson et al. |
| 3,143,720 | 8/1964 | Rogers |
| 3,243,654 | 3/1966 | Wright |
| 3,267,306 | 8/1966 | Hassel et al. |
| 3,275,843 | 9/1966 | Meyerhoff |
| 3,292,021 | 12/1966 | Hoag |
| 3,339,080 | 8/1967 | Howald |
| 3,365,652 | 1/1968 | Schwebel |
| 3,443,128 | 5/1969 | Fakan |
| 3,479,569 | 11/1969 | Prost et al. |
| 3,562,684 | 2/1971 | Sole |
| 3,611,114 | 10/1971 | Sole |
| 3,671,902 | 6/1972 | Westendorp |
| 3,701,906 | 10/1972 | Denel et al. |
| 3,800,256 | 3/1974 | Garwin |
| 3,866,110 | 2/1975 | Ruggeri |
| 3,956,727 | 5/1976 | Wolf |
| 4,032,959 | 6/1977 | Boom et al. |
| 4,079,305 | 3/1978 | Peterson et al. |
| 4,082,991 | 4/1978 | Constant |
| 4,122,512 | 10/1978 | Peterson et al. |
| 4,135,127 | 1/1979 | Khanna et al. |
| 4,195,334 | 3/1980 | Perry et al. |
| 4,222,004 | 9/1980 | Abramian |
| 4,245,287 | 1/1981 | Kustom et al. ................. 363/14 |
| 4,336,561 | 6/1982 | Murphy |
| 4,348,630 | 9/1982 | Boenig et al. |
| 4,414,461 | 11/1983 | Wolf |
| 4,431,960 | 2/1984 | Zucker |
| 4,438,474 | 3/1984 | Paice |
| 4,464,617 | 8/1984 | Yantovsky et al. |
| 4,493,014 | 1/1985 | Higashino |
| 4,532,445 | 7/1985 | Iwamoto et al. |
| 4,577,126 | 3/1986 | Mailfert |
| 4,584,518 | 4/1986 | Higashino et al. |
| 4,599,519 | 7/1986 | Boenig ............................ 363/14 |
| 4,609,831 | 9/1986 | Higashino et al. |
| 4,642,503 | 2/1987 | Ueda et al. |
| 4,695,932 | 9/1987 | Higashino |
| 4,709,314 | 11/1987 | van de Klundert et al. |
| 4,906,861 | 3/1990 | Roy et al. ....................... 323/360 |
| 4,962,354 | 10/1990 | Visser et al. |

Primary Examiner—Steven L. Stephan
Assistant Examiner—Jeffrey Sterrett
Attorney, Agent, or Firm—McAndrews, Held & Malloy Ltd.

[57] ABSTRACT

A superconducting energy stabilizer having multiple load connections employs DC-DC conversion. A discharging DC-DC converter removes stored energy from a superconducting inductive energy storage device or superconducting magnet and delivers the energy to an energy storage cell for use by a load or a utility or industrial electrical distribution system. Regenerated energy can also be retrieved from regenerative type devices and stored in the superconducting magnet for later use. A charging DC-DC converter provides this function. The charging DC-DC converter and the discharging DC-DC converter as well as an off-the-line power supply which provides energy for storage in the superconducting magnet can operate simultaneously under the control of a control system.

20 Claims, 8 Drawing Sheets

SUPERCONDUCTING ENERGY STABILIZER WITH CHARGING AND DISCHARGING DC-DC CONVERTERS

CROSS REFERENCE TO RELATED APPLICATIONS

This application is a continuation-in-part of our pending application Ser. No. 07/594,273 filed Oct. 9, 1990. Said application Ser. No. 07/594,273 is a continuation-in-part of prior application Ser. No. 7/385,014 filed Jul. 25, 1989, now U.S. Pat. No. 4,962,354 issued Oct. 9, 1990.

BACKGROUND OF THE INVENTION

1. Field of the Invention

This invention relates to a superconducting energy stabilizer having multiple load connections employing DC-DC conversion. In particular, the invention relates to an energy stabilizer which utilizes energy stored in a superconducting inductive energy storage device to stabilize the delivery of energy to a DC or AC load or to retrieve and store regenerated energy supplied by the load. Additionally, the invention can supply stored energy to a utility or to an industrial electrical DC or AC distribution system to maintain the level of energy supplied to the consumers.

2. Background of the Prior Art

Prior art superconducting energy storage systems have been directed to the storage of energy derived from an alternating current power system and to the return of the stored energy to the alternating current (AC) power system. Typically, energy is stored during periods of low energy demand when surplus energy exists and is returned to the power system when energy demand is high.

One such system appears in Peterson et al., U.S. Pat. No. 4,122,512. Peterson et. al. uses a reversible alternating to direct current converter to convert the alternating current obtained from the AC power system into direct current for storage in a superconducting magnet and for converting the stored direct current into alternating current for return to the AC power system. This type of system, while providing for the efficient storage and return of energy to the AC power system, cannot perform the simultaneous storage and release of energy.

Another superconducting energy storage system described in Higashino, U.S. Pat. No. 4,695,932, discloses an energy storage circuit which converts three-phase alternating current to direct current for storage in a superconducting energy storage coil. A DC capacitor and chopper circuit are used to control the amount of direct current in the superconducting energy storage coil. According to Higashino, this configuration allows the current capacity of the converter to be scaled down in accordance with service power established by the current rating of the coil, and also allows a reduction of operation losses.

Known superconducting energy storage systems provide for the efficient storage and return of energy but cannot perform the simultaneous storage and release of energy. In addition, Higashino has a practical problem of charging the superconductive energy storage coil with a capacitor whose voltage must correspond to the voltage of the AC power system. For a 480 Volt AC system this would be around 650 volts DC. This voltage is too high to charge the superconducting energy storage coil near its maximum rated current, unless the coil is significantly oversized to accommodate the higher voltage value. Normally, a voltage of ten to twenty volts would be more appropriate for charging the coil. Even if Higashino's system used a step down transformer at the AC line in order to drop the capacitor bank voltage, the capacitor bank would need to provide a higher current which results in higher losses and costs due to a bigger magnet current and size.

In addition, these systems do not provide a means to boost the current delivered by the superconducting energy storage coil. If a utility or industrial electrical distribution system needs higher current than the magnet current, the known system using a chopper and a capacitor can not provide such a function.

Visser et al., U.S. Pat. No. 4,962,354, issued to Superconductivity, Inc. on Oct. 9, 1990 describes a superconducting voltage stabilizer. The superconducting voltage stabilizer comprises an AC/DC converter, a voltage regulator, an energy storage cell and a superconducting energy storage coil. Alternating current is converted to direct current and is stored in a superconducting energy storage coil. The stored direct current is released to an energy storage cell which in turn delivers the energy to a load. Energy is released in a controlled fashion according to the energy requirements of the load to thereby stabilize the load's operation. This patent, U.S. Pat. No. 4,962,354, is incorporated herein by reference.

SUMMARY OF THE INVENTION

The superconducting energy stabilizer having multiple load connections and employing DC-DC conversion acts as an energy stabilizer for delivering energy to systems at a rate and at an amount that insures proper system operation. The superconducting energy stabilizer maintains the amount of energy delivered to a load or to a utility or industrial electrical distribution system by controlling the level of energy maintained in an energy storage cell. In addition, the superconducting energy stabilizer can also remove energy from systems that create regenerated energy and store that energy in a superconducting inductive energy storage device for later use. The superconducting energy storage device is also known as a "superconducting magnet" by those skilled in the art.

The superconducting magnet stores current received from a power supply connected to the electrical distribution system. The power supply converts alternating current to direct current in the case of an AC supply or is a DC to DC converter for a DC power line.

The superconducting energy stabilizer controls the energy level of the energy storage cell which is coupled to the loads or to the electrical utility system. A DC to DC converter is placed between the superconducting inductive energy storage device and the energy storage cell for either releasing energy from or delivering energy to the superconducting inductive energy storage device. The energy storage cell, which can include a capacitor bank, a battery, or an inductor, is used as an intermediary between the loads or utility systems and the storage device to direct energy to or from the loads or systems.

Two types of DC to DC converters are used in the present invention. A discharging DC to DC converter delivers energy from the superconducting inductive energy storage device to the energy storage cell for use by a load. The discharging DC to DC converter provides, as one benefit, the means to retrieve additional energy which previously could not be recovered from the superconducting inductive energy storage device, thereby providing higher energy usage of the magnet. For instance, one type of discharging DC to DC converter can boost the magnet current three times higher than the primary current contained within the magnet. Consequently, the present invention has additional applications not anticipated or realized by prior art designs.

A charging DC to DC converter delivers energy from a load which creates regenerative power to the superconducting inductive energy storage device for storage and later use. The charging DC to DC converter charges the magnet by using the energy storage cell as a source, while the discharging DC to DC converter draws energy from the superconducting magnet to charge the energy storage cell. In addition, the power supply and the charging DC to DC converter can operate simultaneously to charge the superconducting magnet or can operate separately to charge the superconducting magnet according to the state of the electrical distribution system and the regenerative loads.

DESCRIPTION OF THE PREFERRED EMBODIMENTS

Figure 1:
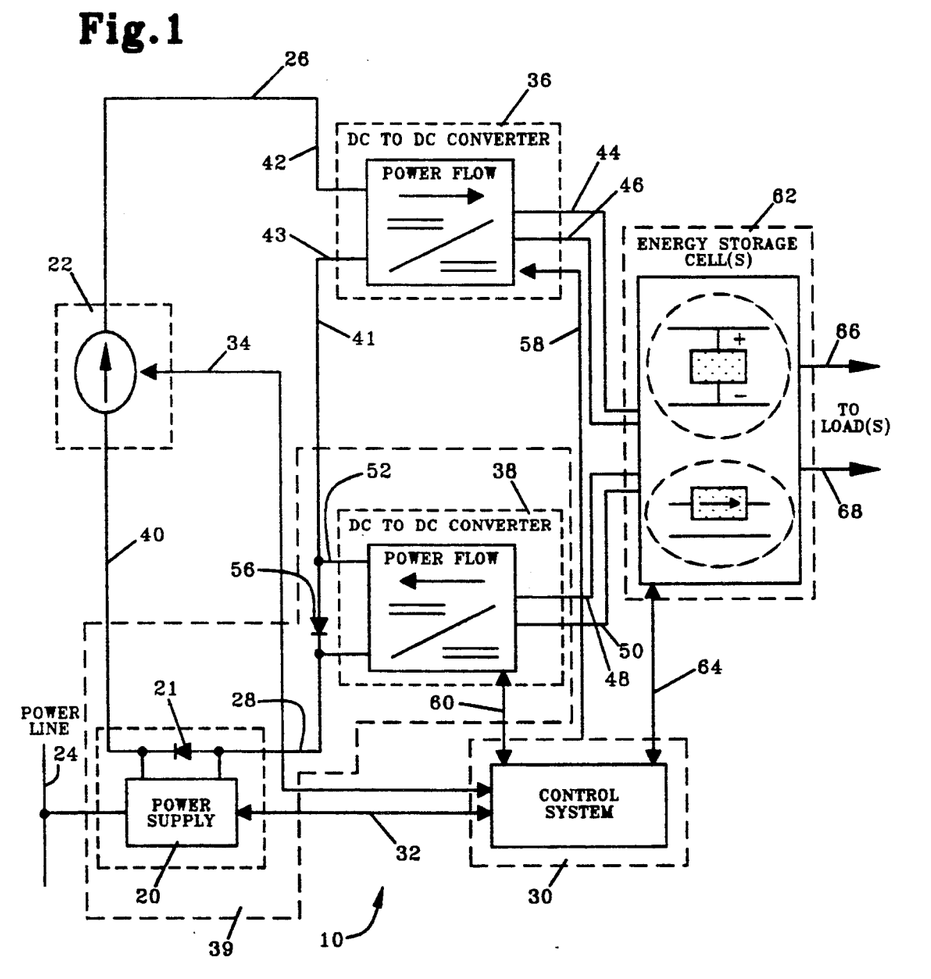
FIG. 1 is a schematic diagram of a superconducting energy stabilizer having multiple load connections and employing DC-DC conversion in accordance with one embodiment of the present invention.

Referring now to FIG. 1, a superconducting energy stabilizer having multiple load connections and employing DC to DC conversion embodying the present invention is shown generally by the numeral 10. The superconducting energy stabilizer includes a power supply 20 with a free wheeling diode 21 and a superconducting inductive energy storage device 22.

The power supply 20 is coupled to a power supply line 24 which typically carries three-phase alternating current. The power supply 20 comprises an AC to DC converter for converting the alternating current of the supply line 24 into direct current. The power supply 20 can also be a DC to DC converter if the supply line 24 is a DC power line. The direct current is stored in the superconducting inductive energy storage device 22. In the illustration, the superconducting energy storage device 22 is shown as an arrow signifying the direction of current flow when energy is released. The magnet is charged in the direction of this arrow while the output of power supply 20 reverse-biases the free-wheeling diode 21 and consequently the power supply 20 acts as a voltage source. Consequently, the free-wheeling diode 21 is used to maintain the flow of current in the direction of the arrow once the magnet is fully charged.

Many types of superconducting inductive energy storage devices are well known in the art and can be used here. The power supply 20 can be connected to the superconducting magnet as shown. The power supply 20 and the magnet 22 are coupled to the remainder of the system through a first lead 26 and a second lead 28.

A control system 30 provides the control functions necessary for controlling the operations of the superconducting energy stabilizer 10. In the illustrated embodiment, the control system is coupled to the power supply 20 and the storage device 22 through control lines 32 and 34 respectively. The control line 32 controls the production of direct current supplied to the storage device 22. Once the storage device 22 is sufficiently charged, the power supply 20 maintains the level of stored current in the magnet 22 by supplying sufficient energy to compensate for losses in the non-superconducting current path through the action of a control signal sent through the control line 32. The control line 34 monitors and controls the cooling systems and refrigeration systems necessary to maintain the environment of the magnet. A more detailed discussion of the storage of current in the storage device 22 is found in Visser at al., U.S. Pat. No. 4,962,354.

Coupled to the superconducting energy storage circuit at the first lead 26 and the second lead 28 is at least one DC-DC converter. In FIG. 1, a discharging DC-DC converter 36 and a charging DC-DC converter 38 are shown. The discharging DC-DC converter 36 is necessary to deliver stored energy to a load or a utility system, while at least one of the power supply 20 and charging DC-DC converter 38 is needed to provide energy to the superconducting magnet 22. The discharging DC-DC converter 36 includes an arrow illustrating the direction of power flow away from the storage circuit, since the discharging DC-DC converter 36 releases energy from the superconducting inductive energy storage device 22. The charging DC-DC converter 38 delivers regenerated energy retrieved from the load for storage in the storage device 22.

A charging converter 39 for the superconducting magnet comprises the power supply 20 and the charging DC-DC converter 38. The charging converter 39 has two outputs 40 and 41. The power supply 20 and charging DC-DC converter 38 can either be coupled in parallel or in series to charge the magnet with a wide range of voltages. Additionally, the charging converter 39, under control of the control system 30, can charge the magnet in a variety of ways. In one instance, the charging converter charges the magnet rapidly with a relatively high voltage when the magnet current is far below its maximum value and gradually reduces the output voltage to a lower value in order to charge the superconducting magnet slowly and safely when the current approaches its maximum value. As a result, the constant power output of an off-the-line power supply, like the power supply 20, and the charging DC-DC converter 38 charges the superconducting magnet safer and faster than a constant voltage charging scheme.

The control system 30 includes charging converter control means for controlling the operation of the charging converter 39. The charging converter control means includes variable output control means for controlling the output of the charging converter. Variable control of the output of the charging converter 39 provides flexibility in charging the magnet. Both the construction and operation of the charging converter control means and variable output control means are well known by those skilled in the art.

By interchanging the charging DC-DC converter 38 for the power supply 20, the entire system can be configured in several ways. Depending upon the application, inputs and/or outputs of multiple DC-DC converters of one type (for instance: two charging DC-DC converters) can be independently connected in parallel or series to increase the power handling capability of the system. Some illustrative configurations are discussed later and illustrated in FIG. 5.

Each DC-DC converter has a pair of input terminals and a pair of output terminals. The input terminals receive energy from an energy generating or energy storage device, while the output terminals deliver energy to an energy storage device or energy storage cell. Discharging DC-DC converter 36 has a pair of input terminals 42 and 43 and a pair of output terminal 44 and 46. Charging DC-DC converter 38 has a pair of input terminals 48 and 50 and a pair of output terminals 52 and 54. Across the output terminals 52 and 54 is a freewheeling diode 56 which provides a current path when the charging DC-DC converter 38 is charging the coil 22.

This series configuration of DC-DC converters permits the discharging DC-DC converter 36 and the charging DC-DC converter 38 as well as the off-the-line power supply 20 to operate simultaneously under the control of the control system 30.

The power supply 20 and the charging DC-DC converter 38 can be a backup for each other in case that they are used together or they can be coupled in parallel for alternate use. In addition, the discharging DC-DC converter 36 and the charging DC-DC converter 38 can be lumped into one DC-DC conversion topology for directing a power flow even though the advantages of simultaneous operation are lost.

The release and delivery of energy through the input and output terminals is controlled through the action of the control system 30. A control line 58 controls the operation of the discharging DC-DC converter 36 while a control line 60 provides a similar function for the charging DC-DC converter 38.

The discharging DC-DC converter 36 through the output terminals 44 and 46 and the charging DC-DC converter 38 through input terminals 48 and 50 are coupled to an energy storage cell or cells 62. The energy storage cell 62 stores energy either received from the superconducting inductive energy storage device or from the load or power distribution system. The energy storage cell 62 can either comprise one energy storage cell or a number of energy storage cells such as a capacitor bank, a battery, an inductor or the like. The choice of energy storage cell 62 depends on the application and can be either a voltage or current source.

The control system 30 through a line 64 monitors the amount of energy stored in the energy storage cell 62. This information is used to control the amount of energy either released to or removed from the energy storage cell 62.

The energy storage cell 62 delivers energy to or receives energy from the load through a pair of terminals 66 and 68. While only two terminals are illustrated, the number of terminals between the cell 62 and the loads or distribution system varies upon the application as would be understood by one skilled in the art.

In general, DC-DC converters direct the flow of power from one point to another in the form of direct current. The DC-DC converters are designed to convert an input current and an input voltage to an output current and an output voltage having values satisfying the intended work to be performed by the superconducting energy stabilizer.

The use of one type of discharging DC-DC converter 36 provides as one benefit a greater energy utilization of the energy stored in the superconducting magnet 22. Previously, the magnet could not supply a sufficient amount of current to the load if the load connected to the energy storage cell 62 consumed the same amount of current as that stored in the magnet. The current level of the storage device could not drop below the level of current required by the load, thereby limiting the amount of recoverable energy.

Figure 2:
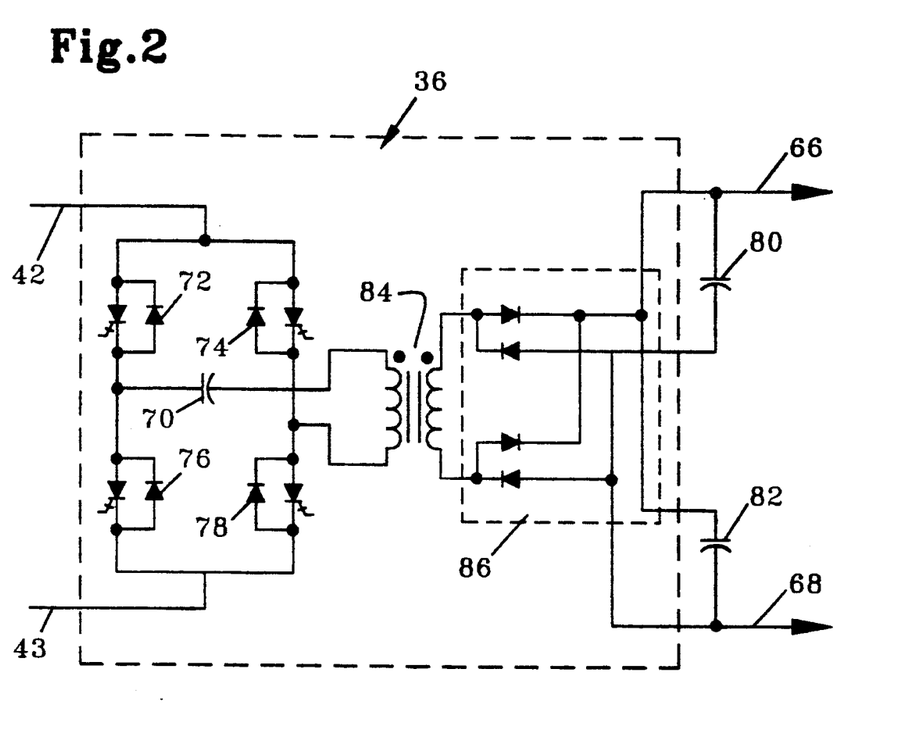
FIG. 2 is a schematic diagram showing a discharging DC-DC converter.

FIG. 2 illustrates one type of the discharging DC-DC converter 36 which increases the energy usage of the magnet. This circuit is pulse-width-modulated (PWM) type DC-DC converter using a 3:1 transformer. This DC-DC converter can boost magnet current three times higher than the magnet's primary current. As a result, the energy usage of the magnet increases from 0% to 88.9% as shown by the following equation:

$$\text{Energy Usage (\%)} = \frac{(I^2_{magnet} - I^2_{load}) \times 100}{I^2_{magnet}}$$

$$= \frac{(3 \times I_{load})^2 - I^2_{load}) \times 100}{(3 \times I_{load})^2}$$

$$= 88.9\%$$

A similar circuit is illustrated as FIG. 4 in co-pending application Superconductive Voltage Stabilizer Having Improved Current Switch, Ser. No. 07/594,273 filed Oct. 9, 1990 and incorporated herein by reference. FIG. 2, in addition to the circuit diagram illustrated in FIG. 4, includes a capacitor 70 which is used in a practical application as opposed to the ideal circuit of FIG. 4 in the co-pending application. Capacitor 70 is a coupling capacitor for preventing the transformer from saturating. The addition of a plurality of anti-parallel diodes 72, 74, 76, and 78 across each of the gate-turn-off devices (GTO) provides device protection. Two output capacitors 80 and 82 represent one means of embodying the energy storage cell 62.

A three to one transformer 84 or current boost transformer generates a current three times the current as that provided by the superconducting magnet to produce an energy usage of 88.9% of the energy stored in the magnet as illustrated in the previously stated equation. A diode bridge 86 is used to change the induced current in the secondary winding of the transformer 84 to direct current for storage in the energy storage cell.

Figure 3:
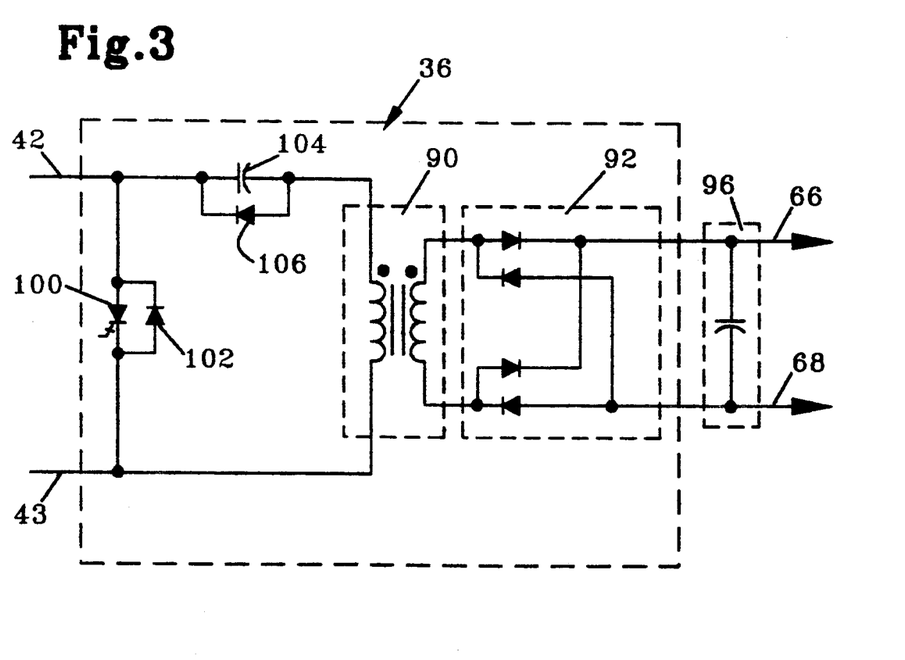
FIG. 3 is a schematic diagram showing another embodiment of a discharging DC-DC converter.

FIG. 3 illustrates another embodiment of the discharging DC-DC converter 36. The discharging DC-DC converter 36 is coupled to the superconducting magnet 22 and the charging DC-DC converter 38 as previously described. This embodiment of the discharging DC-DC converter 36 includes a two to one transformer 90 having the secondary coupled to a diode bridge 92 for conversion of the induced current to direct current. The direct current is stored in the energy storage cell 96 for supply to a load.

Direct current is received from the superconducting magnet at the input terminals 42 and 43. A GTO 100 is connected across these terminals to provide a means for delivering direct current to the transformer 90. Coupled across the GTO 100 is an anti-parallel diode 102 which provides protection for the GTO. A capacitor 104 connects one side of the GTO to one side of the two to one transformer 90. Connected across the capacitor is a diode 106.

During operation, the GTO 100 is controlled by the control system 30. When the GTO 100 is off, direct current from the superconducting magnet 22 flows through the capacitor and the primary of the two to one transformer 90. Once the capacitor charges to a preselected value, the control system, which monitors the voltage, closes the GTO 100 so that current flows through the GTO. During this time the capacitor discharges and current flows in a direction opposite to the direction of previous current flow. The diode 106 limits the reverse current, thereby preventing the capacitor 104 from reversing charge. In this fashion, the direction of the direct current is changed through the primary of the transformer 90 thereby inducing an alternating current in the transformer secondary. The diode bridge 92 changes the alternating current to provide direct current for storage in the energy storage cell 96.

Figure 4:
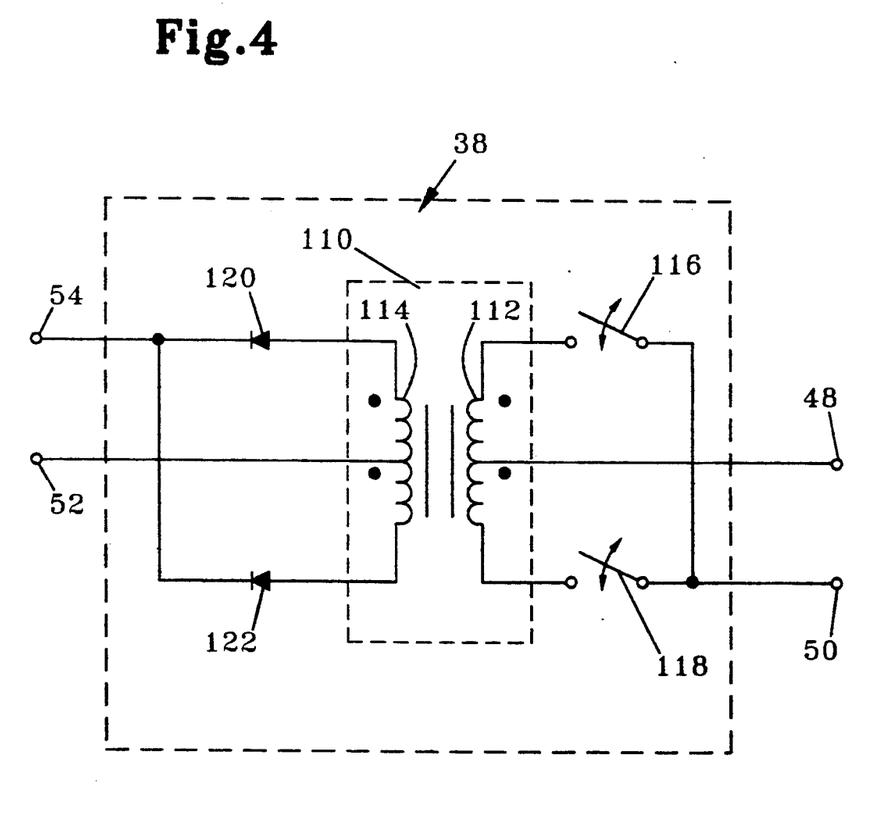
FIG. 4 is a schematic diagram showing a charging DC-DC converter.

FIG. 4 illustrates one possible embodiment of the charging DC-DC converter 38. As shown, this DC-DC converter replaces the one shown in FIG. 1 as shown by the input terminals 48 and 50 and the output terminals 52 and 54. A transformer 110 has a center tap primary 112 and a center tap secondary 114. The center tap of the primary is connected to the input terminal 48. Each side of the primary is connected to the other input terminal 50, each coupled through a switch 116 and a switch 118. This circuit and others suitable for a charging DC-DC converter can be found in a book entitled *Modern DC-to-DC Switching Power Converter Circuits* written by Rudolf P. Severns and Gordon Bloom, published by Van Nostrand Reinhold Company, Inc. (1985).

The input terminals 48 and 50 are coupled to a load which produces regenerated energy. One example of this is a motor/generator used in electrically operated trains, elevators or mining operations.

The center tap of the secondary is coupled to the output terminal 52, while each side of the secondary is coupled to the output terminal 54 through a diode 122 and a diode 120.

The switch 116 and the switch 118 operate alternately and have conduction duty cycles of less than 50% to alternate the flow of current through one half of the primary 112 and then the other half of the primary. The alternation of current induces current in the corresponding halves of the secondary 114. The diodes 120 and 122 direct the induced current in a single direction through the output terminals 52 and 54 for storage in the superconducting magnet 22.

Operation of the discharging DC-DC converter 36 and the charging DC-DC converter 38 is independent. Each of the DC-DC converters could be of the charging type and energy stored in the magnet could be generated solely by the power supply 20. The number of DC-DC converters coupled to the superconducting energy storage circuit is only limited by the current handling capacity of the magnet and the energy requirements of the loads. In addition, the number of charging DC-DC converters is not limited except to be one less than the total number of DC-DC converters so that stored energy can be released to at least one load.

FIG. 5 illustrates additional configurations of the superconducting energy stabilizer having multiple load connections and employing DC-DC conversion. The configurations are labeled A-I, but it is understood that many more configurations are possible in light of the teachings disclosed herein.

Figure 5A:
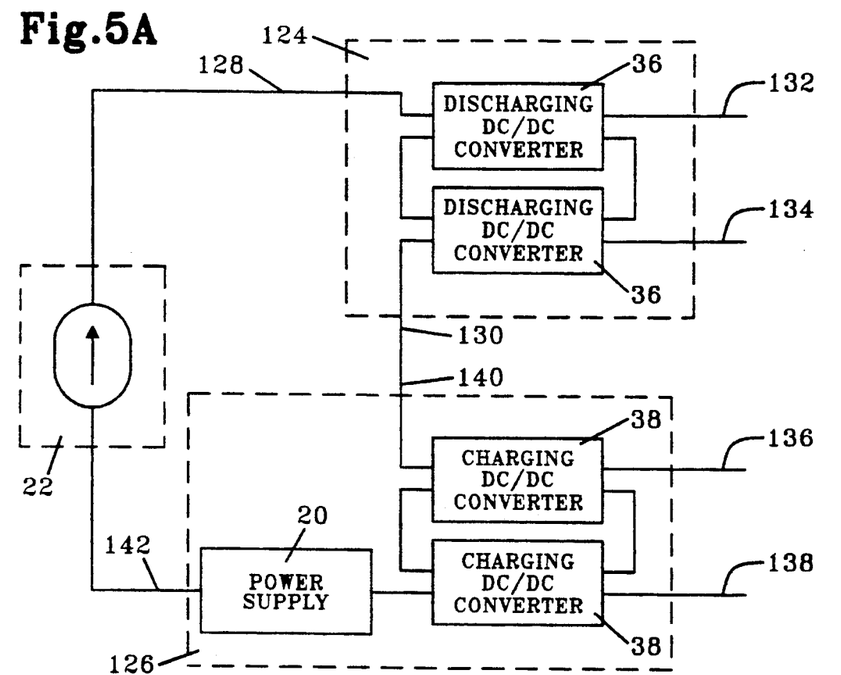
FIGS. 5A-5I are schematic diagrams of a variety of configurations of the present invention.

FIG. 5A illustrates one possible configuration of the present invention. In this embodiment, the invention comprises the superconducting magnet 22, a discharging converter 124 and a charging converter 126. Discharging converter 124 includes two inputs 128 and 130 and two outputs 132 and 134. These inputs and outputs correspond to inputs 42 and 43 and outputs 44 and 46 respectively as shown in FIG. 1. The charging converter 126 includes two inputs 136 and 138 and two outputs 140 and 142. These inputs and outputs correspond respectively to inputs 48 and 50 and outputs 40 and 41 of the charging converter 39 also shown in FIG. 1.

Each embodiment shown in FIG. 5 has the input 128 connected to one side of the superconducting magnet 22, the input 130 connected to the output 140 and the output 142 connected to the other side of the superconducting magnet 22. Each embodiment differs, however, as to the structure of the individual discharging converters 124 and charging converters 126.

In FIG. 5A, the discharging converter 124 consists of two discharging DC-DC converters 36. Each discharging DC-DC converter 36 includes two inputs and two outputs as previously described. The two discharging DC-DC converters 36 have the input lines connected so that the input of each device is in series with respect to the other input. The outputs of each discharging DC-DC converter 36 are connected in a similar fashion so that the outputs are coupled in series with respect to each other.

Similarly, the outputs and the inputs to the charging DC-DC converters 38 are connected in a serial configuration. In addition, the charging converter 126 includes the power supply 20 connected serially to the other charging DC-DC converters 38.

The serial configuration of inputs to the discharging converter 124 allows the individual discharging DC-DC converters to be constructed of lower voltage components to achieve the same output. The serial connection of output provides a greater output voltage than could be achieved with a single discharging DC-DC converter 36. The number of discharging DC-DC converters is not limited to one or two but can be of any number as required by the specific application.

Likewise, the inputs 136 and 138 of the charging converter 126 are coupled individually to one input of one charging DC-DC converter 38 and one input of the other charging DC-DC converter 38. The remaining inputs of the individual charging DC-DC converters 38 are coupled together to form a series input configuration. The outputs of each charging DC-DC converter 38 are likewise connected in series. The series connection of outputs are coupled to the power supply 20. The use of the power supply 20 and the charging DC-DC converters 38 enables the superconducting magnet to be charged by either the power supply 20 or the charging DC-DC converters 38 or both at the same time. The number of charging DC-DC converters is not limited to one or two.

Figure 5B:
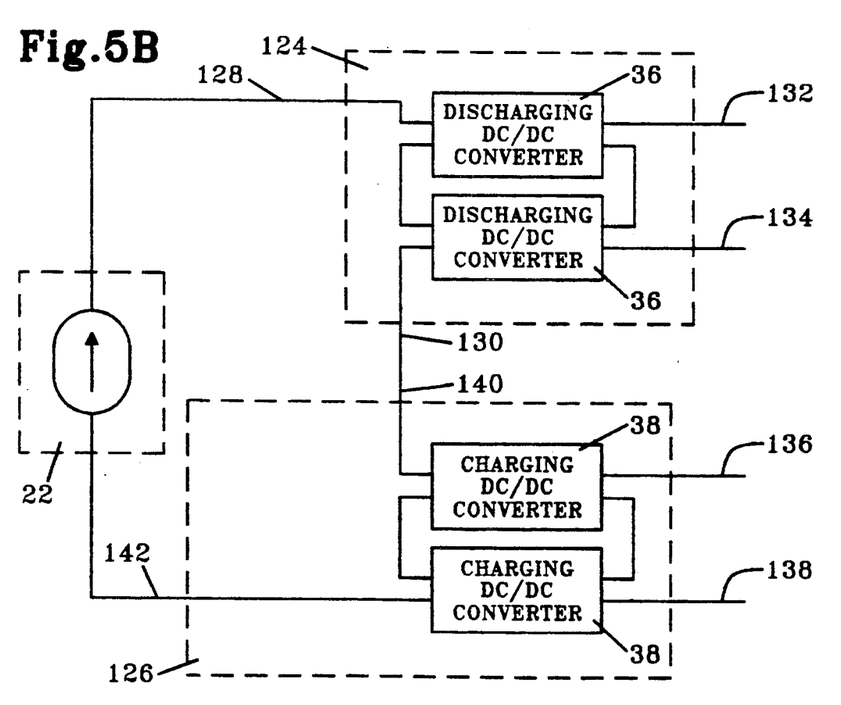

FIG. 5B is another configuration which is similar to FIG. 5A. The power supply 20 has been removed from the charging converter 126 for situations in which sufficient regenerated energy is created to enable the superconducting magnet to be charged to capacity without the need for the power supply 20.

Figure 5C:
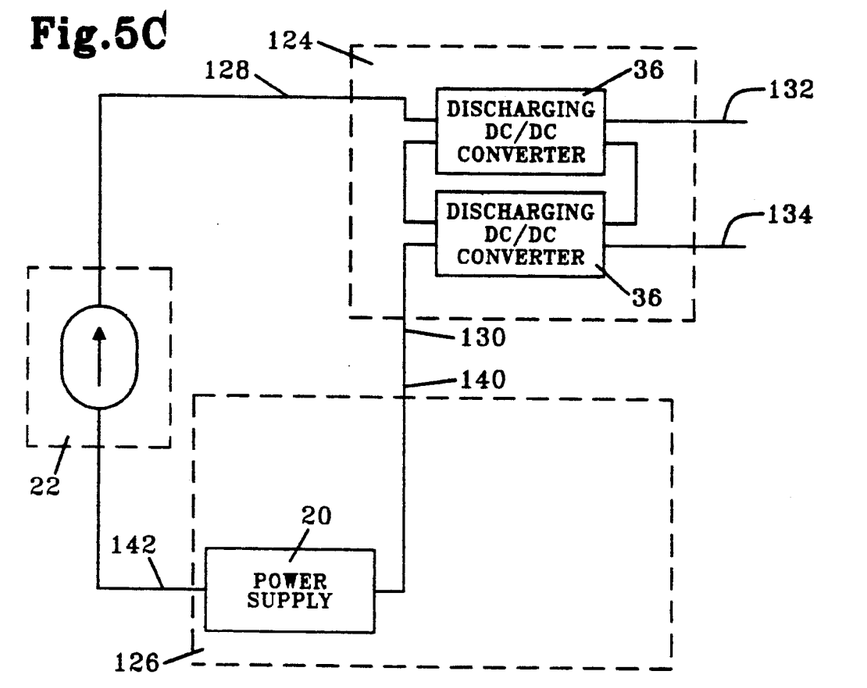

FIG. 5C corresponds to the previously described configurations of FIGS. 5A and 5B. In this instance however, the charging converter 126 is comprised solely of the power supply 20. This configuration is particularly applicable in situations where the loads do not create regenerated energy for storage in the superconducting magnet 22.

Figure 5D:
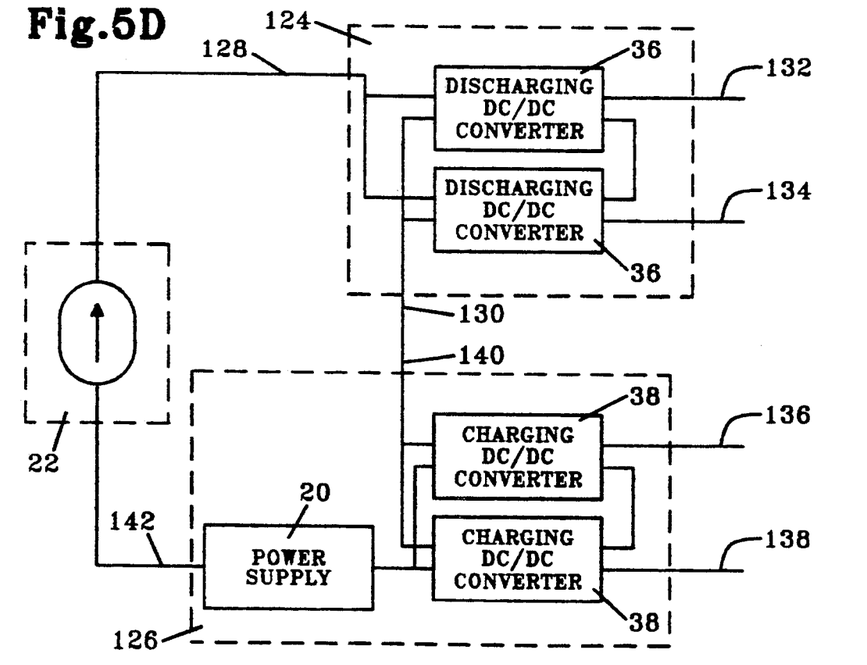

FIG. 5D illustrates a configuration in which the two discharging DC-DC converters 36 have their inputs connected in parallel. This configuration is advantageous for situations in which the components comprising the input circuitry do not have a sufficient current rating to handle the current delivered by the superconducting magnet 20. The outputs of the individual discharging DC-DC converters 36 are connected in the same manner as those of FIGS. 5A-5C.

The charging converter 126 of FIG. 5D has the inputs of the individual charging DC-DC converters 38 connected as in FIGS. 5A-5C. The outputs of the individual charging DC-DC converters are connected in parallel to reduce the current carrying requirements of the components comprising the output sections of these converters.

Figure 5E:
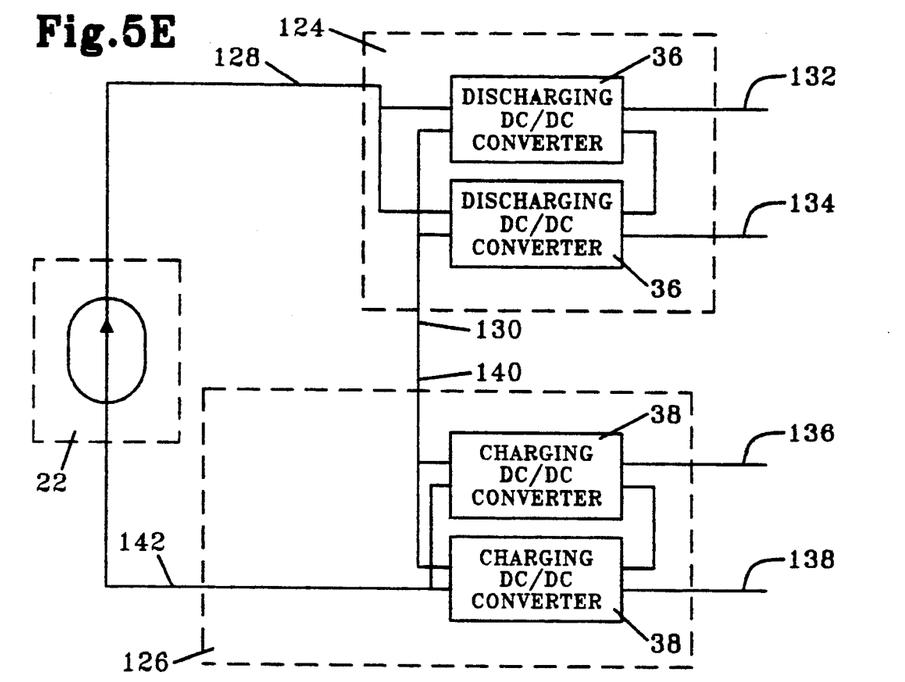
Figure 5F:
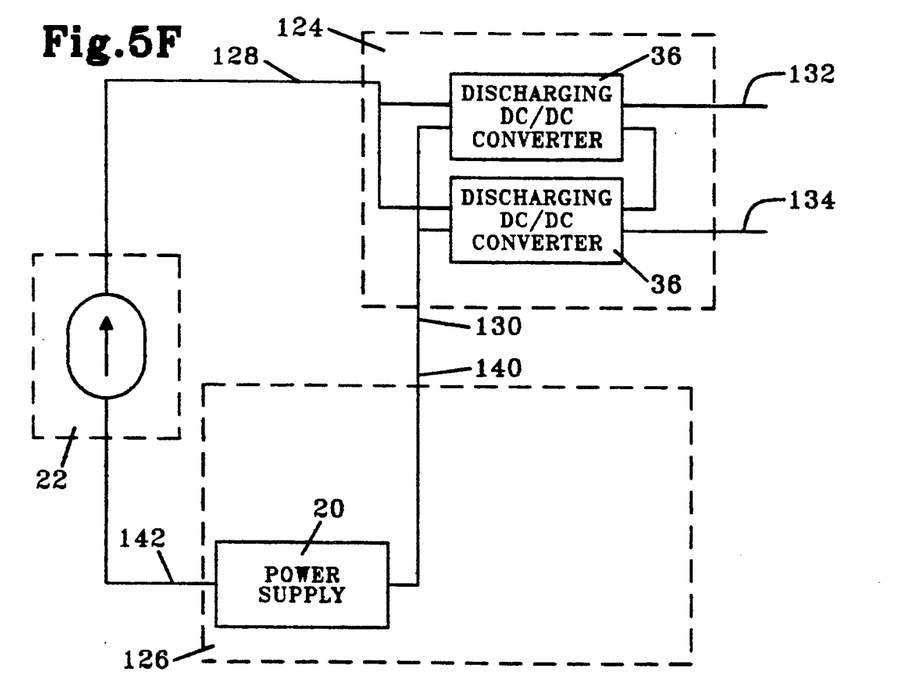

FIGS. 5E and 5F are similar to 5D except for the configuration of the charging converter 126. FIG. 5E does not include the power supply 126, while FIG. 5F does not include the two charging DC-DC converters 38 for reasons previously described.

Figure 5G:
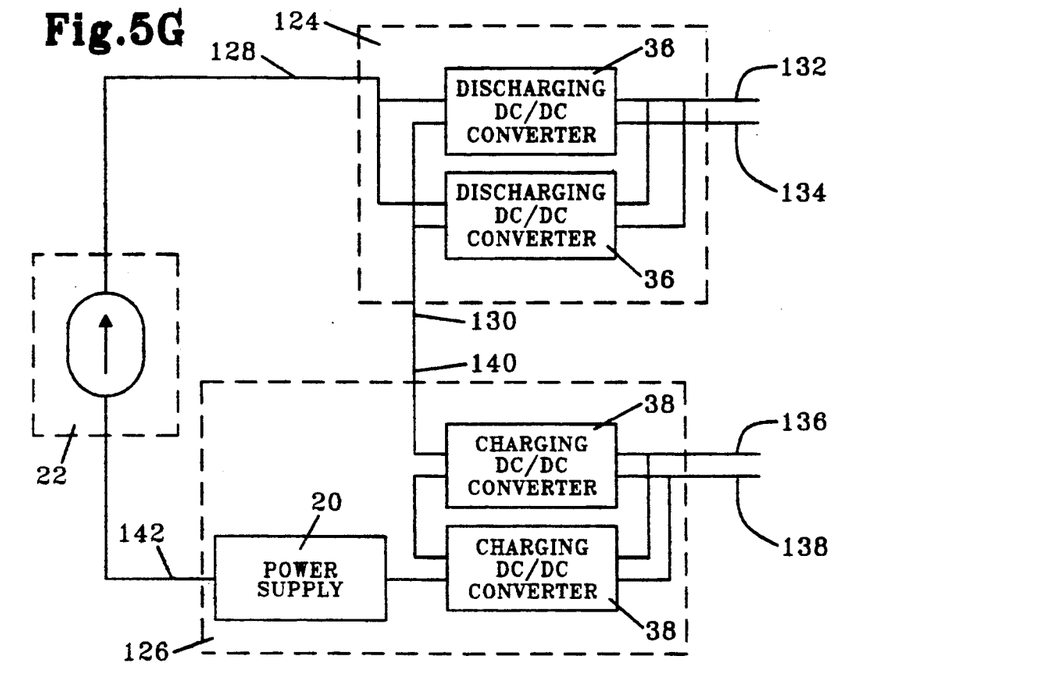
Figure 5H:
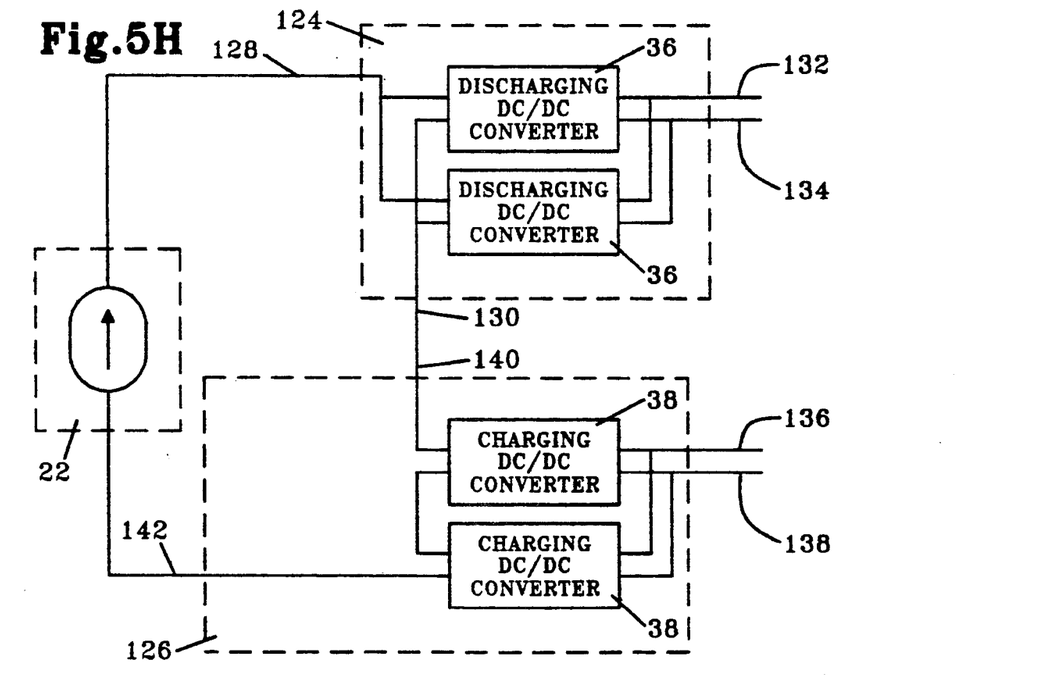
Figure 5I:
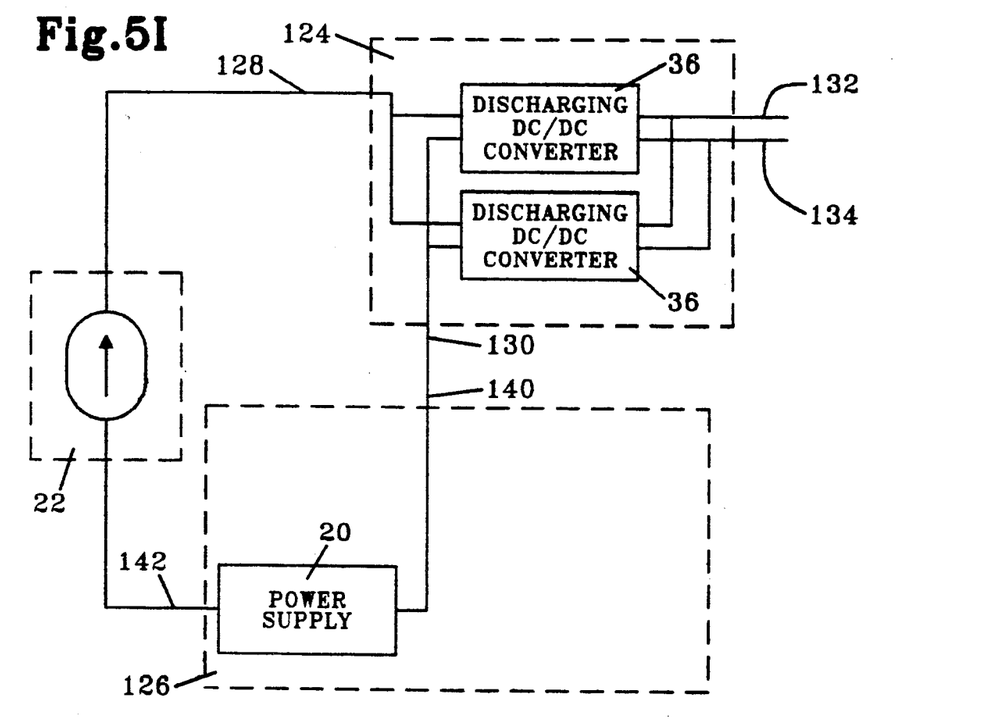

FIGS. 5G-5I include additional configurations for the discharging converters 124 and the charging converters 126. In each of these figures, the inputs to each of the discharging DC-DC converters 36 are connected in parallel and the outputs of said converters 36 are also connected in parallel. For the charging converters 126 in FIGS. 5G and 5H, the inputs to the individual charging DC-DC converters 38 are connected in parallel while the outputs are connected in series. FIG. 5I illustrates the configuration in which the charging converter 126 includes only the power supply 20.

As can be seen from FIGS. 5A-5I, many variations are possible and are not limited to those illustrated. For instance, another variation includes changing the serial connection of the outputs of the discharging DC-DC converters 36 in FIG. 5A. Instead of serially connecting the outputs of the discharging DC-DC converters 36, each pair of outputs from each individual DC-DC converter 36 is connected directly to an energy storage cell which in turn would be connected to an individual load. In this configuration, a number of loads are driven by individual discharging DC-DC converters 36. By monitoring the energy level of each energy storage cell, individual loads are driven according to their energy requirements.

The foregoing description of the invention has been presented for purposes of illustration and description. It is not intended to limit the invention to the precise forms disclosed, and obviously many modifications and variations are possible in light of the above teachings.

What is claimed is:

1. A superconducting energy stabilizer having multiple load connections and employing DC-DC conversion for storing energy in a superconducting inductive energy storage device having a first end and a second end, and for releasing the stored energy from the superconducting inductive energy storage device to a load or loads or to a utility or an industrial electrical distribution system, said superconducting energy stabilizer having multiple load connections and employing DC-DC conversion comprising:

energy storage cell means for supplying energy to the load, loads or to the electrical distribution system and for receiving regenerated energy from the load or loads, said energy storage cell having a plurality of first connections and a plurality of second connections, said plurality of first connections coupled to the load, loads or electrical distribution system;

discharging DC-DC converter means for releasing energy from the superconducting inductive energy storage device to said energy storage cell means, said discharging DC-DC converter means having input terminals, output terminals, and a discharging control line means for carrying signals controlling the operation of said discharging DC-DC converter means, one of said input terminals of said discharging DC-DC converter means coupled to the first end of the superconducting energy storage device, and said output terminals coupled to said plurality of second connections of said energy storage cell means;

charging converter means for producing direct current, including charging control line means for carrying signals controlling the operation of said charging converter means, said charging converter means in circuit with the second end of the superconducting inductive energy storage device and in circuit with one of the input terminals of said discharging DC-DC converter means; and a control means for controlling the operation of said discharging DC-DC converter means and said charging converter means, said control means coupled to said discharging control line means and to said charging control line means.

2. The superconducting energy stabilizer having multiple load connections and employing DC-DC conversion of claim 1 wherein said control means comprises charging converter control means for controlling the operation of said charging converter means.

3. The superconducting energy stabilizer having multiple load connections and employing DC-DC conversion of claim 2 wherein said charging converter control means comprises variable output control means for variably controlling the output of said charging converter to charge the superconducting inductive energy storage device in a variable voltage charging scheme.

4. The superconducting energy stabilizer having multiple load connections and employing DC-DC conversion of claim 1 wherein said discharging DC-DC converter means comprises a plurality of discharging DC-DC converters, each of said discharging DC-DC converters having inputs and outputs.

5. The superconducting energy stabilizer having multiple load connections and employing DC-DC conversion of claim 4 wherein said inputs of said discharging DC-DC converters are connected in series.

6. The superconducting energy stabilizer having multiple load connections and employing DC-DC conversion of claim 4 wherein said inputs of said discharging DC-DC converters are connected in parallel.

7. The superconducting energy stabilizer having multiple load connections and employing DC-DC conversion of claim 4 wherein said outputs of said discharging DC-DC converters are connected in series.

8. The superconducting energy stabilizer having multiple load connections and employing DC-DC conversion of claim 4 wherein said outputs of said discharging DC-DC converters are connected in parallel.

9. The superconducting energy stabilizer having multiple load connections and employing DC-DC conversion of claim 1 wherein said charging converter means comprises a power supply means for producing direct current for storage in the superconducting inductive energy storage device.

10. The superconducting energy stabilizer having multiple load connections and employing DC-DC conversion of claim 1 wherein said charging converter means comprises a power supply and a charging DC-DC converter means for converting regenerated energy supplied by a regenerative load into direct current for storage in the superconducting inductive energy storage device, said power supply in circuit with said charging DC-DC converter means, said charging DC-DC converter means including a plurality of input terminals coupled to said second connections of said energy storage cell means, and a plurality of output terminals.

11. The superconducting energy stabilizer having multiple load connections and employing DC-DC conversion of claim 1 wherein said charging converter means comprises a charging DC-DC converter means for converting regenerated energy supplied by a regenerative load into direct current for storage in the superconducting inductive energy storage device, said charging DC-DC converter means including a plurality of input terminals coupled to said plurality of second connections of said energy storage cell means, and a plurality of output terminals.

12. The superconducting energy stabilizer having multiple load connections and employing DC-DC conversion of claim 11 wherein said charging DC-DC converter means comprises a plurality of charging DC-DC converters, each of said charging DC-DC converters having inputs and outputs.

13. The superconducting energy stabilizer having multiple load connections and employing DC-DC conversion of claim 12 wherein said inputs of said charging DC-DC converters are connected in a series.

14. The superconducting energy stabilizer having multiple load connections and employing DC-DC conversion of claim 12 wherein said inputs of said charging DC-DC converters are connected in parallel.

15. The superconducting energy stabilizer having multiple load connections and employing DC-DC conversion of claim 12 wherein said outputs of said charging DC-DC converters are connected in series.

16. The superconducting energy stabilizer having multiple load connections and employing DC-DC conversion of claim 12 wherein said outputs of said charging DC-DC converters are connected in parallel.

17. The superconductng energy stabilizer having multiple load connections and employing DC-DC conversion of claim 1 wherein said discharging DC-DC converter means comprises:
a current boost transformer having a primary winding and a secondary winding;
means for alternating the direction of the flow of current through said primary winding, said means for alternating connected to said input terminals of said discharging DC-DC converter;
means for coupling said secondary winding to said output terminals of said discharging DC-DC converter for developing an induced current in said secondary winding; and means for directing said induced current in a single direction through said output terminals of said discharging DC-DC converter.

18. The superconducting energy stabilizer having multiple load connections and employing DC-DC conversion of claim 9 wherein said control means comprises simultaneous control means for controlling simultaneous operation of said discharging DC-DC converter means, said charging DC-DC converter means, and said power supply means.

19. The superconducting energy stabilizer having multiple load connections and employing DC-DC conversion of claim 1 wherein said discharging DC-DC converter means comprises:
a first inductor for carrying current;
a second inductor for carrying current;
means for alternating the direction of the flow of current through said first inductor, said means for alternating connected to said input terminals of said discharging DC-DC converter means;
means for magnetically coupling said first inductor and said second inductor;
means for coupling said second inductor to said output terminals of said discharging DC-DC converter for developing an induced current in said second inductor; and
means for directing said induced current in a single direction through said first output terminals of said discharging DC-DC converter means.

20. The superconducting energy stabilizer having multiple load connections and employing DC-DC conversion of claim 1 wherein said charging DC-DC converter means comprises:
a center tap transformer having a primary winding and a secondary winding, said primary winding including a first end, second end, and a center tap, said secondary winding including a first end, a second end, and a center tap;
a first input terminal and a second input terminal comprising said input terminals of said charging DC-DC converter means, said first input terminal coupled to said center tap of said primary winding;
a first output terminal and a second output terminal comprising said output terminals of said charging DC-DC converter means, said second output terminal coupled to said center tap of said secondary winding;
a first controllable switch coupling said second input terminal to said first end of said primary winding;
a second controllable switch coupling said second input terminal to said second end of said primary winding;
a first unidirectional current valve connecting said first side of said secondary winding to said first output terminal; and
a second unidirectional current valve connecting said second side of said secondary winding to said second output terminal.

* * * * *